E. H. LINDMAN.
ARTIFICIAL ZENITH.
APPLICATION FILED NOV. 28, 1911.

1,090,633.

Patented Mar. 17, 1914.

Witnesses
James E. Sproll.
Clara A. Harm.

Inventor
Erik H. Lindman.
By Stephen H. Brooks
Attorney

UNITED STATES PATENT OFFICE.

ERIK H. LINDMAN, OF SEATTLE, WASHINGTON.

ARTIFICIAL ZENITH.

1,090,633.

Specification of Letters Patent.

Patented Mar. 17, 1914.

Application filed November 28, 1911. Serial No. 662,847.

*To all whom it may concern:*

Be it known that I, ERIK H. LINDMAN, a citizen of the United States, and a resident of Seattle, in the county of King and State of Washington, have invented certain new and useful Improvements in Artificial Zeniths Connected to Sextants for Astronomical Observation, of which the following is a specification.
My invention has for its primary object the provision of a construction for determining the angle at the eye between an object and the zenith, the invention being particularly useful for taking astronomical observations on water when the horizon is obscured or invisible, although it can obviously be employed in like capacity on land or in the air.

Briefly described, my invention comprises a zenith indicator, with which is associated means for directing a reflection from the same into coincidence with the line of vision through a suitable sighting means.

I have shown my invention applied to a sextant of well known construction. It can however, as an attachment, be provided on any suitable nautical or other instrument intended for astronomical observations.

I do not limit my invention for use as an attachment, for, as hereinbefore premised, my invention resides broadly in the provision of a structure adapted or designed for determining one's position by measuring what I term the "zenith distance" instead of the altitude.

Figure 1:
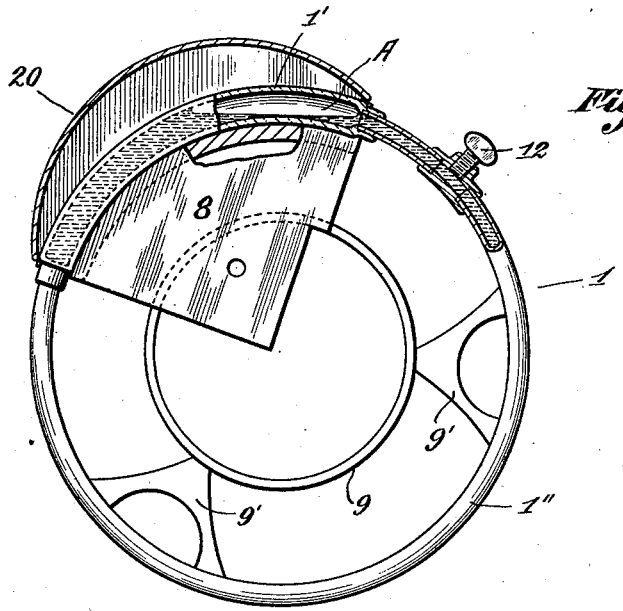
Figure 2:
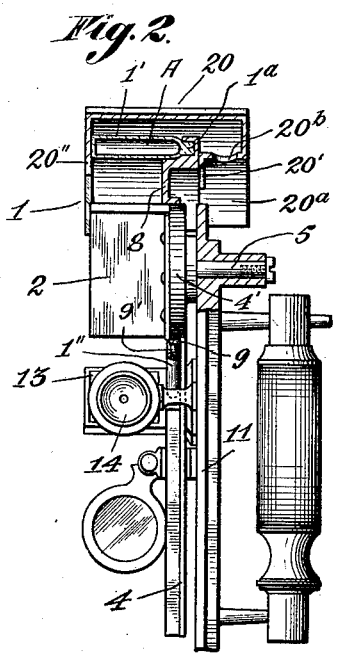
Figure 3:
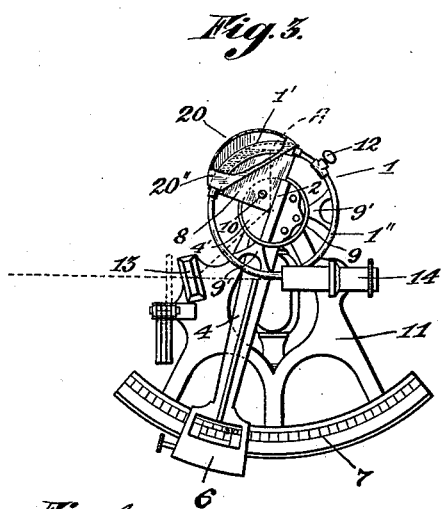
Figure 4:
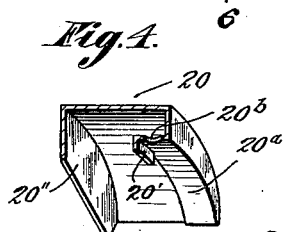

Referring to the accompanying drawing, wherein like numerals of reference indicate like parts throughout: Figure 1 is a side elevation with parts broken away, of my attachment removed. Fig. 2 is a fragmentary vertical section of a sextant equipped with my invention. Fig. 3 is a front elevation thereof, parts being broken away, and Fig. 4 is a fragmentary perspective of the hood.
Referring to the drawing by characters of reference, 1 designates an artificial zenith indicator, having an indicator element shiftable through the influence of gravity. Indicator 1 conveniently comprises a transparent tube or chamber 1' containing preferably a dark or opaque fluid, and the movable indicator element in this construction consists of a bubble A, as clearly shown, this permitting of the passage of light through the indicator to a suitable mirror or reflector 2.

Reflector 2 is shown as consisting of the usual index glass of the sextant, being fixed to radius 4, which latter has a hub part or boss 4' provided with a stub shaft 5 journaled in the plane or body 11 of the instrument.

Reference numeral 6 indicates the vernier and 7 the usual graduated arc coöperating therewith.

Tube or chamber 1' which is comparatively wide and flat is curved concentrically to shaft 5 and conveniently connected with a tube section 1'' of metal or other suitable material, the latter communicating with the opposite end portions of chamber 1' and thereby providing a continuous passage for the fluid of the indicator, which continuous or circular passage is not however absolutely essential.

Tube or chamber 1' is provided with a side rib 1$^a$ which is made fast, as by cement, in a groove of a wide bearing member or plate 8 to which is fixed a curved ring-like band 9 which latter, during the positioning of my device on a sextant, is slipped over the hub part or boss 4' until the inner end portion of member or plate 8 bears against the end face of said boss, see Fig. 3. A screw, as 10, is preferably employed to prevent turning or accidental displacement of the attachment on the instrument.

Tube section 1'' which is fixed to radial webs or arms 9', is provided with a suitable filling aperture normally closed by a plug 12.

Reference numeral 13 indicates my object glass, this as shown, consisting of the usual horizon glass, and 14 indicates the eye piece or telescope, this in conjunction with glass 13, constituting the means for sighting an object.

Reference numeral 20 indicates a hood adapted to be placed over chamber 1', when an artificial light or illuminating means is required to obtain a reflection of bubble A, the same resting on the end portions of said chamber and having vertical side walls 20' 20'' which snugly fit the sides thereof. Wall 20' forms an extension of a bottom wall 20$^a$, which latter is formed with an opening 20$^b$ through which a suitable illuminating means (not shown) is inserted during the taking of an observation.

In the use of my invention, for example, on a dark night, at sea, plane or body 11 is held in vertical position. Then a known star or planet is sighted through telescope 14 and the unsilvered half of glass 13. Following this, radius 4 is adjusted until the reflection of the bubble of indicator 1 is received on the silvered half of glass 13 in line with the object. Referring now to arc 7 and vernier 6 we read in degrees the indicated spacing of the object from the zenith, and by subtracting such reading from 90° we find the altitude.

Having thus described my invention what I claim as new, and desire to secure by Letters Patent of the United States, is:—

1. A device of the character described comprising a body, a zenith indicator supported on said body for rotary movement, said indicator comprising a chamber partly filled with a fluid to thereby provide a bubble, a reflector supported for movement in common with said indicator and arranged to receive a reflection of the bubble thereof, and means for sighting an object and simultaneously observing the reflection from said reflector.

2. A device of the character described comprising a body, a zenith indicator supported on said body for rotary movement, said indicator comprising a chamber partly filled with a fluid to thereby provide a bubble, a reflector supported for movement in common with said indicator and arranged to receive a reflection of the bubble thereof, an object glass on said body having mirror and transparent sections, the mirror section being arranged to receive a reflection from said reflector, and an eye piece on said body for sighting an object through the transparent section of said glass.

3. A device of the character described comprising a body, a zenith indicator supported on said body for rotary movement, said indicator comprising a transparent chamber curved concentrically to its center of movement and partly filled with a colored fluid, a reflector for reflecting the bubble of said indicator supported for movement in common with the latter, and means for simultaneously sighting an object and the reflection from said reflector.

4. In combination with a sextant or like instrument, a zenith indicator supported for movement with the index glass thereof to cast a reflection thereon.

5. In combination with a sextant or like instrument, a zenith indicator supported for movement with the index glass thereof to cast a reflection thereon, said indicator comprising a transparent chamber partly filled with a fluid.

6. In combination with a sextant or like instrument, a zenith indicator supported for movement with the index glass thereof to cast a reflection thereon, said indicator comprising a transparent chamber partly filled with a fluid and curved concentrically to the center of the radius of such instrument.

7. A device of the character described comprising a body, a zenith indicator supported on said body, said indicator comprising a chamber partly filled with fluid, a reflector pivotally supported on said body and arranged to receive a reflection from said indicator, an object glass comprising adjacent sections one of which consists of a reflector arranged to receive the indicator reflection from said first named reflector, and means for sighting an object through said object glass.

ERIK H. LINDMAN.

Witnesses:
P. O. HOLLAND,
C. M. MILLER.

Copies of this patent may be obtained for five cents each, by addressing the "Commissioner of Patents, Washington, D. C."